United States Patent [19]
Johnson

[11] 3,960,398
[45] June 1, 1976

[54] CARRIER APPARATUS

[76] Inventor: Hiram K. Johnson, 1220 Timbershore Lane, Eagan, Minn. 55123

[22] Filed: Jan. 22, 1975

[21] Appl. No.: 543,143

[52] U.S. Cl. ................................. 294/16; 294/113
[51] Int. Cl.² .......................................... B66C 1/44
[58] Field of Search .............. 294/16, 28, 31.2, 106, 294/113, 118; 224/45 AA, 45 P, 45 C; 248/311–313

[56] References Cited
UNITED STATES PATENTS

| | | | |
|---|---|---|---|
| 224,137 | 2/1880 | Brown | 294/16 |
| 664,623 | 12/1900 | Buckland | 294/16 |
| 953,234 | 3/1910 | Rountree | 294/113 |
| 964,432 | 7/1910 | Kemmler | 294/113 |
| 1,337,518 | 4/1920 | Kelly | 294/31.2 |
| 1,460,268 | 6/1923 | Ottman | 294/31.2 X |
| 2,218,845 | 10/1940 | Kiggins | 294/16 |
| 2,749,173 | 6/1956 | Peterson | 294/16 X |

*Primary Examiner*—Evon C. Blunk
*Assistant Examiner*—Johnny D. Cherry
*Attorney, Agent, or Firm*—Burd, Braddock & Bartz

[57] ABSTRACT

A carrier for manual transport of a cylindrical tank of the type used for containing oxygen, acetylene, propane, helium, and the like. The carrier includes a pair of jaw members in assembled relationship surrounding a portion of the cylindrical tank wall. The jaw members have arcuate yokes located on diametrically opposite sides of the tank wall, each yoke having a relatively sharp upper arcuate gripping edge. Coupling means connect the yoke members to permit relative pivotal movement of the jaw members about an axis perpendicular to the longitudinal axis of the tank. Handle means are associated with each of the jaw members whereby upward movement on one or more of the handle members to lift the tank effects relative pivotal movement of the jaw members and gripping engagement of the gripping edges of the jaw members with the tank side wall whereby the tank is lifted and transported.

6 Claims, 5 Drawing Figures

CARRIER APPARATUS

BACKGROUND OF THE INVENTION:

Cylindrical tanks are in common usage for storage and dispensing of numerous fluids and gases such as acetylene, oxygen, butane, propane, and many more. Such tanks are typically heavy and transport thereof, particularly in the field, presents a difficult task for a single man, or even for two men in the case of larger tanks. The smooth surface of the tank side wall renders grasping the tank difficult. The possibility of breakage of a valve or gauge on the tank due to dropping during manual transport renders the task potentially dangerous.

Various clamping apparatus have been devised to assist in manually transporting such tanks or other cylindrical storage containers. For example, see U.S. Pat. No. 215,344 to Flynn and U.S. Pat. No. 3,817,435 to De Luca et al. Yet it is desirable to provide a carrying apparatus quickly and readily engageable with and disengageable from tanks of the type described while at the same time allowing easy transport thereof by one or two men over rugged terrain.

SUMMARY OF THE INVENTION

The invention relates to a manual carrier for carrying or transporting tanks of the type having cylindrical side walls and used for containing oxygen, acetylene, propane, helium, or a variety of other fluids or gases. The carrier includes a pair of jaw members which, in assembled relationship, loosely circumscribe or surround a portion of the cylindrical tank in a relaxed position and securely grip or pinch the tank in the transport position. The carrier grips the tank responsive to the weight of the tank. The jaw members have arcuate yokes located on diametrically opposite sides of the tank. Each yoke is shaped to generally conform to a segment on the tank side wall. Each yoke has an upper, relatively sharp gripping edge located adjacent the tank wall. The ends of each yoke are coupled to the corresponding ends of the opposite yoke to permit pivotal movement of the jaw members about an axis perpendicular to the longitudinal axis of the cylindrical side walls of the tank. Coupling means which couple the yokes together are located in substantially complementary relationship relative to the mid-portion of the gripping edge of each yoke. Each jaw member has a handle member adapted to be gripped and lifted for carrying the tank. Upon the gripping and lifting of one or both handle members, the jaw members pivot about the aforementioned axis whereby the gripping edges of the yokes move into gripping or biting relationship relative to the cylindrical side walls of the tank. The carrier thus grips the tank and allows transport thereof upon continued upward force exerted on one or both handle members to carry the tank. When the upward force on the handle members is relaxed, as when the tank is put down, the carrier returns to the orientation of being loosely assembled about the cylindrical side wall, and is thus readily removed from about the tank.

An object of the invention is to provide a carrier for manually carrying or transporting cylindrical tanks of the type described. A second object of the invention is to provide such a carrier which is readily assembled and readily removed from such a tank. A further object of the invention is to provide such a carrier confortably usable by one or two individuals to transport such a tank. Further objects of the invention will become apparent upon the following description.

IN THE DRAWINGS

DESCRIPTION OF PREFERRED EMBODIMENT

Figure 1:
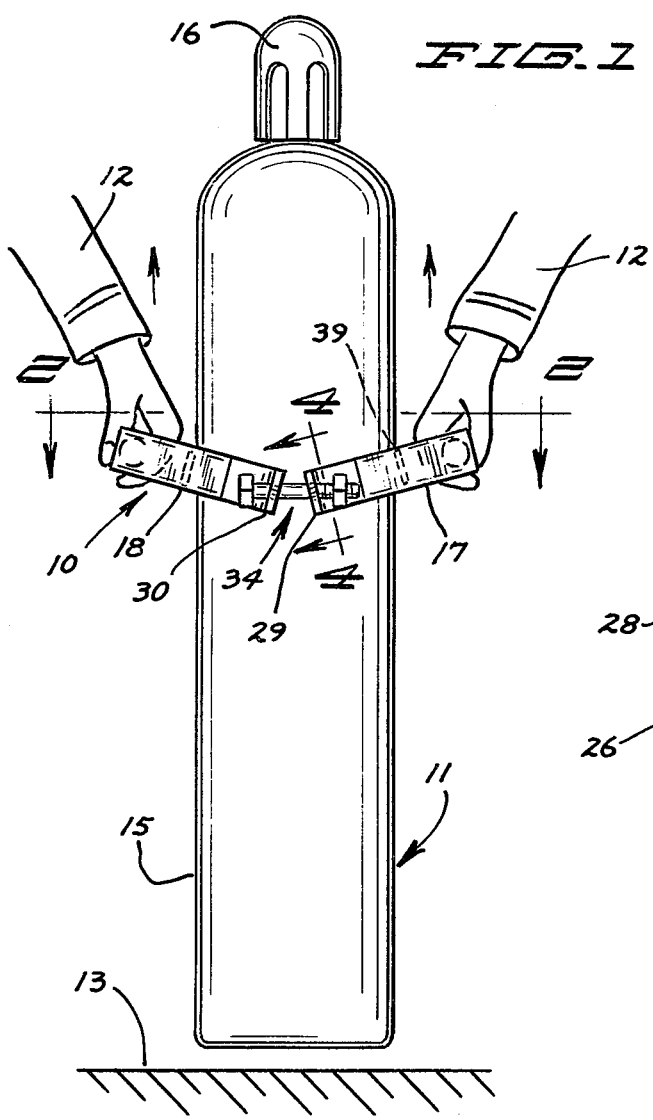
FIG. 1 is a side elevational view of a cylindrical tank in transport by use of the carrier apparatus of the present invention.
Figure 2:
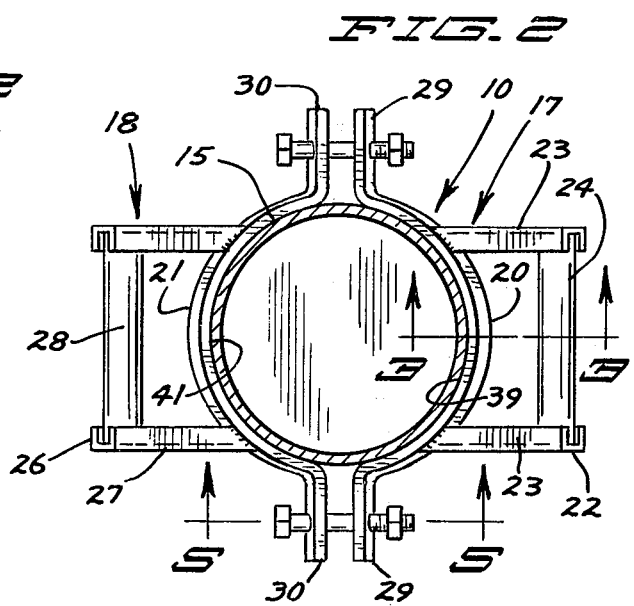
FIG. 2 is a sectional view of the tank and carrier apparatus of the invention taken along the line 2—2 of FIG. 1.

Referring to the drawings, there is shown in FIG. 1 the carrier or apparatus of the invention indicated generally at 10 for manual transport of a tank or similar elongate object. Carrier 10 engages a tank 11 and is held by arms and hands 12 of a pair of individuals to support tank 11 above a terrain 13 for transport. Tank 11 is of the common variety that may contain any of a large variety of fluids or gases such as acetylene, oxygen, helium, propane, and the like, for many diverse uses. Tank 11 has a cylindrical side wall 15 disposed about a generally upright longitudinal axis. A removable protective cap 16 at the upper end of the tank 11 shields and protects the usual valves and gauges (not shown).

Carrier apparatus 10 includes a pair of symmetrical jaw members 17, 18 assembled about a cylindrical segment of cylindrical side wall 15 of tank 11. Jaw members 17, 18 are pivotally coupled together for relative rotation with respect to one another about an axis perpendicular to the longitudinal axis of side wall 15. First jaw member 17 has an arcuate yoke 20 constituted as a flat band contoured to substantially conform to the curvature of an arcuate segment of the outer perimeter of wall 15. Yoke 20 is located adjacent side wall 15 and spans an arcuate segment of side wall 15 approximately one-half the perimeter thereof having ends on generally opposite sides of tank 11. Second jaw member 18 has an arcuate yoke 21 constituted as a flat band contoured to substantially conform to the curvature of wall 15. Second yoke 21 is located diametrically opposite first yoke 20 and approximately spans the opposite half of the perimeter of tank 11 having ends adjacent the ends of first yoke 20. Facing yokes 20, 21 define a generally circular pattern encircling a circular cross-sectional segment of tank 11.

Handle means on carrier apparatus 10 includes a first handle 22 on first jaw member 17 attached to first yoke 20 located midway between the ends thereof. A pair of parallel arms 23 are fastened to first yoke 20 as by welding and extend symmetrically outward therefrom. The outward ends of arms 23 are connected by a grasp member 24. A second handle 26 is likewise connected to second yoke 21 located midway between the ends thereof and includes a pair of parallel arms 27 extending outward from second yoke 21 and being connected at the outer ends by grasp member 28. Grasp members 24 and 28 are adapted to be grasped by the hands of persons desiring to transport the tank 11.

Figure 3:
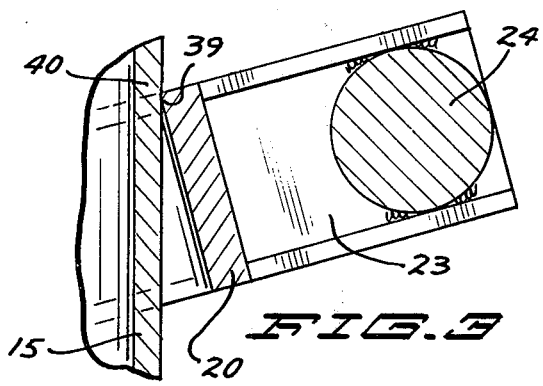
FIG. 3 is a sectional view of the carrier apparatus and tank of FIG. 2 taken along the line 3—3 thereof.
Figure 4:
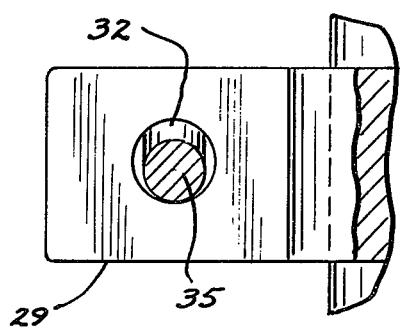
FIG. 4 is a sectional view of a portion of the carrier apparatus of FIG. 1 taken along the line 4—4 thereof.
Figure 5:
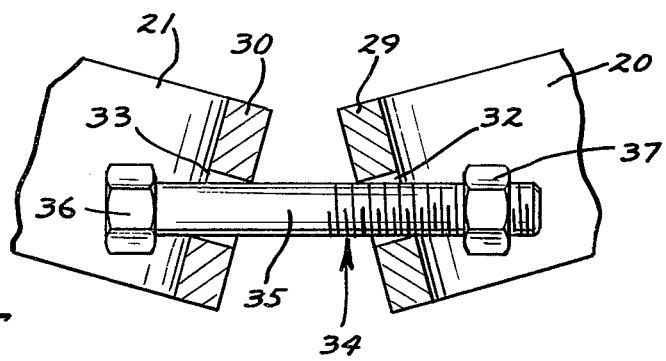
FIG. 5 is a sectional view of the carrier apparatus shown in FIG. 2 taken along the line 5—5 thereof.

Coupling means are provided for pivotally coupling the first and second jaw members together for relative rotation about an axis perpendicular to the longitudinal axis of side wall 15 and passing between the first and second jaw members. Each end of yoke 20 of first jaw member 17 is provided with outwardly directed end flanges 29, 29 extending away from side wall 15 of tank 11. Likewise, yoke 21 of second jaw member 18 at either end is provided with outwardly directed end flanges 30, 30. The respective flanges 29, 30 of the first and second yokes 20, 21 are in facing relationship, slightly spaced apart, and provided with generally aligned holes 32, 33, respectively, as shown in FIG. 3. A linear coupling link assembly pivotally connecting the respective flanges 29, 30 is shown to include a nut and bolt assembly 34, as best illustrated in FIG. 3. A shank 35 of nut and bolt assembly 34 passes through the respective holes 32, 33 of flanges 29, 30 on either side of tank 11. Shank 35 is restrained at one end by a head 36 and at the opposite end by a nut 37. As shown in FIG. 4, the diameter of shank 35 is sufficiently less than the diameter of the holes 32, 33 whereby the shank 35 is loosely accommmodated therein. Again referring to FIG. 3, the loose fit of the shank 35 in the holes 32, 33 permits relative pivotal movement of the flanges 29, 30, and thus the jaw members 17, 18 relative to one another about an axis perpendicular to the longitudinal axis of the tank 11. The degree of permissible relative pivotal movement is governed by the diametric differences between the shank 35 on the one hand and the holes 32, 33 on the other. The end limit of pivotal movement is achieved when diagonally opposite edges of the holes 32, 33 simultaneously contact the shank 35, as shown in FIG. 3. The loose fit of shank 35 in the holes 32, 33 allows, within permissible limits, quick adjustment of the space defined between the two yokes 20, 21.

Gripping means are provided in association with carrier 10 to grip tank 11 between jaws 17, 18 upon upward manual force exerted on handles 22, 28 to cause relative pivotal movement of jaws 17, 18. As shown in FIG. 3, yoke 20 has a relatively sharp upper edge 39 or corner on the inside immediately adjacent wall 15 of tank 11. Edge 39 is adapted to angularly approach wall 15 upon upward pivotal movement of yoke 20 and bite into wall 15 as at 40. Sharpened edge 39 is located on yoke 20 generally in complementary relationship or 90° from the pivot assemblies which pivotally connect jaw members 17, 18. Sharpened edge 39 is preferably disposed along the entire breadth of yoke 20. Second yoke 21 likewise has a relatively sharp upper edge 41 disposed along the inside of yoke 21 immediately adjacent wall 15. Upper edge 41 of second yoke 21 is disposed opposite the upper edge 39 of yoke 20 and is likewise adapted to angularly approach the wall 15 and bite into it upon pivotal movement of the jaw member 18. Handles 22 and 26 are diametrically aligned with the mid-portion and most effective portion of gripping edges 39, 41.

In use of carrier apparatus 10, jaw members 17, 18 are adjusted whereby the circular pattern defined by the facing yokes 20, 21 is just larger than the diameter of the cylindrical tank to be transported. The spacing between the yokes is readily achieved by lateral movement of flanges 29, 30 on shank 35 of the pivot assemblies 34. Carrier apparatus 10 is fitted over the top of the tank and positioned at a convenient longitudinal location on said wall 15. In the relaxed orientation, carrier apparatus 10 loosely surrounds a cylindrical segment of said wall 15. A pair of individuals desirous of transporting tank 11 each grasp one of the handles 22, 26 and lift upward. In response to the upward force exerted on the handles, jaw members 17, 18 pivot relative to one another about pivot assembly 34 to the position shown in FIG. 1. Tank 11 is embraced by or pinched between the edges 39, 41 of yokes 20, 21. The weight of tank 11 maintains the pinching moment between the jaw members 17, 18 as the tank is lifted off the terrain 13. Alternatively, a single individual may grasp a handle 22 and lift or pull. A sufficient pinching moment is developed between the jaw members 17, 18 to enable the individual to drag the tank 11 over the terrain.

While there has been shown and described a preferred embodiment of the invention, it will be apparent to those skilled in the art that certain deviations may be made from the structure shown without departing from the scope and spirit of the claimed invention. For example, as such tanks for holding oxygen and the like are typically cylindrical, there has been shown and described a carrier apparatus with jaw members which approach one another to define a generally circular pattern. The shape of the jaw members could be changed to conform to the outer walls of a tank having a cross-section other than circular, such as oval, hexagonal, or the like. The apparatus is also usable to carry logs, fence posts and other such objects.

The embodiments of the invention in which an exclusive property or privelege is claimed are defined as follows:

1. A carrier apparatus for manual transport of a generally cylindrical object of the type having a side wall disposed about a longitudinal axis, said carrier apparatus comprising:

a first jaw member having a first arcuate yoke contoured to substantially conform to the shape of a first segment of the side wall of the object, said first yoke having ends located generally on opposite sides of the object, an outwardly directed end flange extending from each end of the first yoke; a second jaw member having a second arcuate yoke contoured to substantially conform to the shape of the second segment of the side wall of the object, said second yoke having ends located adjacent the ends of the first yoke and having an outwardly directed end flange extending from each end in facing relationship to the end flanges on the first yoke;

said end flanges on adjacent ends of the first and second yokes having relatively aligned holes;

coupling means coupling the adjacent outwardly directed end flanges of the first yoke and second yoke to asemble the first jaw member and second jaw member about the side wall and permit relative pivotal movement of the first and second yokes about an axis perpendicular to the longitudinal axis of the side wall ;

said outwardly directed end flanges being parallel to the pivotal axis of the first and second yokes;

said coupling means including linear coupling link assemblies coupling facing end flanges on adjacent ends of said first and second yokes, each coupling link assembly including a linear shank passing through the relatively aligned holes on an end flange of the first yoke and a corresponding end flange on the second yoke, means on the ends of the shank to prevent disengagement of the shank from the holes of the end flanges;

said first yoke having a gripping edge located adjacent the first segment of the wall means;

said second yoke having a gripping edge located adjacent the second segment of the wall means and located opposite the gripping edge of the first yoke;

each linear shank having a diameter sufficiently less than the diameter of the holes in the end flanges through which it passes to permit variance of the space defined between the first and second yokes and to permit relative pivotal movement of the first and second yokes to bring the gripping edges of the first and second yokes into engagement with the side wall of the object for lifting of the object; and handle means rigidly secured on said jaw members adapted to be manually grasped and lifted to effect relative rotation of said first and second yokes about said axis whereby said gripping means engage the wall means to permit the lifting of the object.

2. The carrier apparatus of claim 1 wherein: the gripping edge on the first yoke includes a relatively sharp upper gripping edge and the gripping edge on the second yoke includes a relatively sharp upper gripping edge.

3. The carrier apparatus of claim 1 wherein: said linear coupling link assembly is constituted as a nut and bolt assembly.

4. The carrier apparatus of claim 3 wherein: each nut and bolt assembly having a bolt with a shank passing through the holes of respective end flanges, said shank being secured at one end by a head and at the opposite end by a nut adjustable threaded on the shank to vary the permissible limits of space defined by the jaw members.

5. The carrier apparatus of claim 4 wherein: said handle means includes a first handle secured to the first jaw member in complementary relationship to said coupling means and having a grasp member parallel to the axis of rotation of the jaw members, and a second handle secured to said second jaw member in complementary relationship to said coupling means and having a grasp member parallel to the axis of rotation of the jaw members.

6. A carrier apparatus for manual transport of a tank of the type having a cylindrical side wall disposed about a longitudinal axis, said carrier apparatus comprising:

a first jaw member having a first arcuate yoke contoured to substantially conform to the curvature of a first arcuate segment of the cylindrical side wall of the tank and having ends generally located on opposite sides of the the tank;

a second jaw member having a second arcuate yoke contoured to substantially conform to the curvature of a second arcuate segment of the cylindrical side wall of the tank and having ends located adjacent the ends of the first yoke;

said first yoke having a relatively sharp upper gripping edge located adjacent the cylindrical side wall of the tank;

said second yoke having a relatively sharp upper gripping edge located adjacent the side wall of the tank and located diametrically opposite the upper gripping edge of the first yoke;

said first and second yokes having mutually opposed, outwardly directed mating end flanges at either end in substantially complementary relationship to the upper gripping edges of said first and second yokes, said mating end flanges having mutually aligned holes;

a shank passing through each set of mutually aligned holes, each shank secured at one end by a head and at the opposite end by a nut, each said nut being threadably adjustable on the shank with respect to said head, each said shank having a diameter sufficiently less than the diameter of the mutually aligned holes to permit variance of the space defined by the jaw members and pivotal movement of the first and second jaw members about an axis passing between the jaw members and perpendicular to the longitudinal axis of the tank for engagement of the tank side wall by the gripping edges;

a handle rigidly secured on each jaw member adapted to be manually grasped and lifted to effect relative rotation of said first and second jaw members about said axis whereby said gripping edges engage the side wall of the tank to permit the lifting thereof, each handle including first and second parallel, spaced apart arms extended from a jaw member symmetrically between the ends thereof in direction perpendicular to the relative axis of rotation of the jaw members, and a grasp member secured between the outer ends of the arms extended parallel to the relative axis of rotation of the jaw members for manually grasping and lifting to lift the tank.

* * * * *

UNITED STATES PATENT AND TRADEMARK OFFICE
CERTIFICATE OF CORRECTION

PATENT NO. : 3,960,398
DATED : June 1, 1976
INVENTOR(S) : Hiram K. Johnson

It is certified that error appears in the above—identified patent and that said Letters Patent are hereby corrected as shown below:

Column 3, line 56, after "upon" insert --upward--.

Column 3, line 68, "said" should be --side--.

Column 4, line 2, "said" should be --side--.

Column 5, line 35, "adjustable" should be --adjustably--.

Signed and Sealed this

Fourteenth Day of September 1976

[SEAL]

Attest:

RUTH C. MASON
Attesting Officer

C. MARSHALL DANN
Commissioner of Patents and Trademarks